No. 898,045. PATENTED SEPT. 8, 1908.
P. E. GONON.
GLASS BRICK, TILE, AND BUILDING BLOCK.
APPLICATION FILED NOV. 21, 1904.
2 SHEETS—SHEET 1.
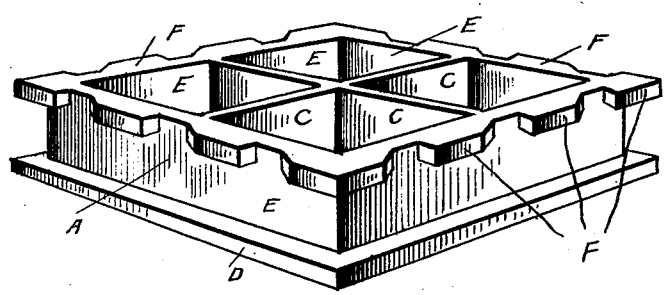
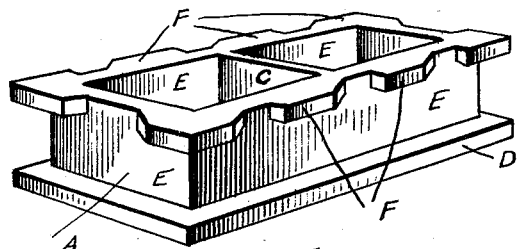
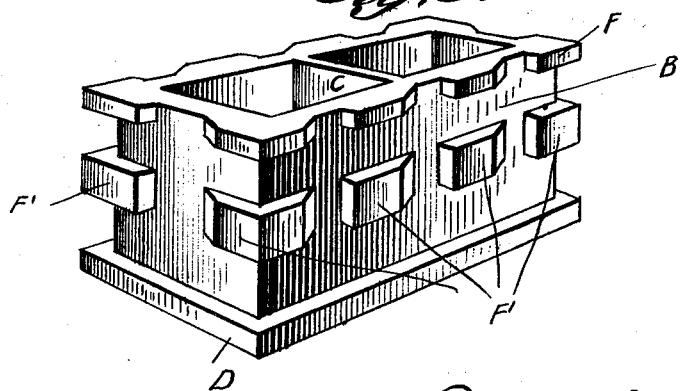
Witnesses
Inventor
Paul E. Gonon
By
Attorney No. 898,045. PATENTED SEPT. 8, 1908.
P. E. GONON.
GLASS BRICK, TILE, AND BUILDING BLOCK.
APPLICATION FILED NOV. 21, 1904.
2 SHEETS—SHEET 2.
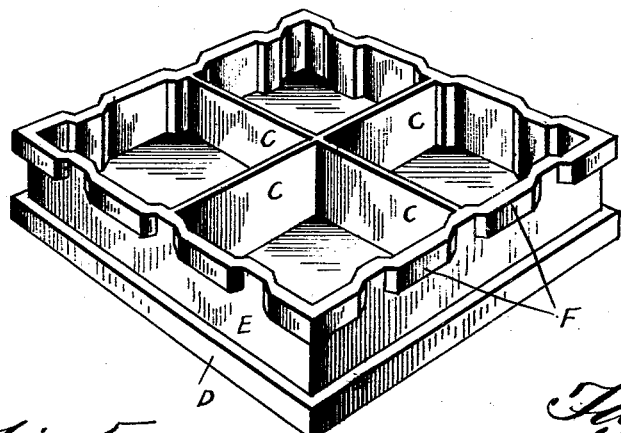
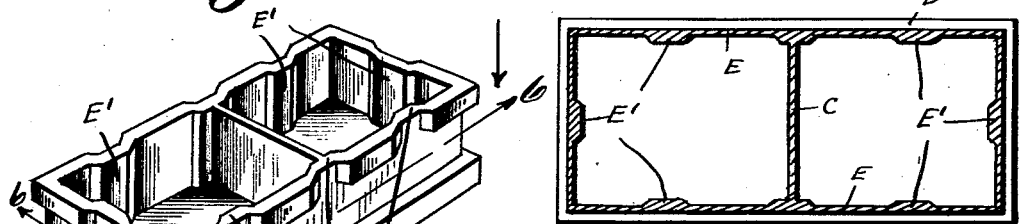
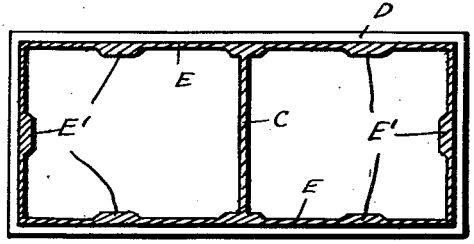
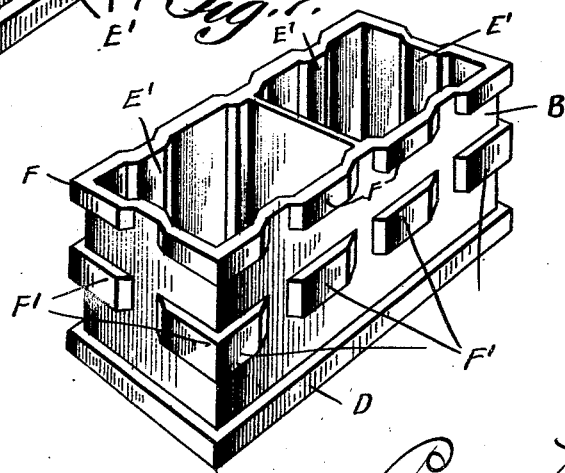

UNITED STATES PATENT OFFICE.

PAUL E. GONON, OF NEW YORK, N. Y.

GLASS BRICK, TILE, AND BUILDING-BLOCK.

No. 898,045.     Specification of Letters Patent.     Patented Sept. 8, 1908.

Application filed November 21, 1904. Serial No. 233,752.

*To all whom it may concern:*

Be it known that I, PAUL E. GONON, citizen of the United States, and resident of New York, in the county of New York and State of New York, have invented certain new and useful Improvements in Glass Bricks, Tiles, and Building-Blocks, of which the following is a specification.

My invention relates to improvements in the construction and manufacture of glass or vitreous brick tiles or building blocks of any desired sizes; where the outer surface of the walls of said bricks, tiles or building blocks are provided with projecting keys increasing in size towards their base, and the space between the bases of each projecting keys forming receptacle intersecting each other to increase the bearing mortar and cement surface of the wall of the body or the bricks, tiles or building blocks for the cement to settle into, when the cement is inserted into the spaces or receptacles in a plastic state, to firmly bind the glass bricks, tiles or building blocks, together to the surface of walls or any desired place where the article is to be used. And the objects of my improvements are to afford facilities for an easy and solid binding of the glass or vitreous bricks, tiles or building blocks when connected together to surface of walls or any desired place where the articles are to be used. I attain these objects by the mechanism illustrated in the drawings in which Figure 1 is a perspective view of a hollow tile, showing the supporting cross-ribs C. C. and walls E. E. Fig. 2 is a perspective view of a modification. Fig. 3 is a perspective view of a modified form of hollow brick or building block. Fig. 4 is a perspective view of another modification. Fig. 5, is a modification of Fig. 4, showing but one cross rib, Fig. 6, is a horizontal section on line 6—6 of Fig. 5, and Fig. 7, is a still further modification.

The building tile A Figs. 1 and 2, consists of a hollow body made of a uniform colored glass, or any suitable vitreous materials, having its inner walls E. E. E. E.; and the inner side of the face plate D. D. connected together by the supporting cross-ribs C. C. made of any desired size or shape. The outer surface of the walls E. E. E. E. are provided with a key or a series of projecting keys, increasing in size towards their bases, and set at certain desired distances apart from each other, the spaces between the bases of each projecting keys F. F. F. F. and face plate D forms receptacles running at right angle to the other to form increased binding and bearing surface on the body of the tiles, bricks or building blocks for the cement to settle into, when the cement has been inserted into the spaces or receptacles, in a plastic state, to firmly bind the tiles, when the cement has become dry and hard.

The brick or building blocks B, Figs. 3 and 7, is constructed in the same manner as the tile A but different in size, and bearing, an additional series of projections F'. F'. F'. F'. to increase the cement bearing surface, and may also be made with a superior or different colored face plate D. The bricks, tiles or building blocks may be constructed any desired shape or form, and the inner side of the walls E'. E'. E'. E'. may be reinforced with additional thickness as shown in Figs. 4, 5, 6, and 7. The tile, brick or building block, are made preferably of a uniform colored mass of glass or vitreous material, but for reasons of economy, and for the purpose of producing a highly, finished commercial article at a minimum cost the body of the tile, brick or building block may be made of an inferior quality of glass or vitreous material, and the face plate D may be made of a superior material or different colored glass, and the body A and the face plate D, molded and united together, simultaneously into an integral part, when the different composition are in a fused or plastic state.

What I do claim as my invention and desire to secure by Letters Patent is:

1. A block of the type set forth consisting of a body having ends, sides, and a face plate, said sides being formed with a series of outwardly projecting keys of quadrilateral form being of greatest area at their bases, the rearmost sides of the keys at the rear edge of the body sides and ends lying flush with the latter, some of said keys being located at the corners of the body and being of L-shape to extend on the sides and adjacent ends of the body.

2. A block of the type set forth consisting of a body having ends and sides, and a plurality of keys of rectangular form on said ends and sides, said keys at the corners of the body being of integral L-shape and extending on the sides and adjacent ends of the body, said keys being arranged in rows.

3. A block of the type set forth consisting of a body having ends and sides, and a plurality of rows of keys on said ends and sides, each key being of substantial rectangular form, one of said rows being arranged intermediate the top and bottom edges of said sides and ends and the other row being arranged so as to have one of their sides disposed flush with the rear edges of said sides and ends, and strengthening members on the inner faces of the sides and ends disposed transverse thereof.

Signed at New York in the county of New York and State of New York this 18th day of November A. D. 1904.

PAUL E. GONON.

Witnesses:
ROBERT B. FLOYD JONES,
J. M. COLOMBANI.